United States Patent
Noddings et al.

(10) Patent No.: US 9,964,698 B1
(45) Date of Patent: May 8, 2018

(54) MULTICORE OPTICAL FIBER CABLE STRAIN ENHANCEMENT

(71) Applicant: THE BOEING COMPANY, Chicago, IL (US)

(72) Inventors: Kenneth C. Noddings, Manhattan Beach, CA (US); Frederick L. Brinlee, Hermosa Beach, CA (US); Brian J. Fujimori, Torrance, CA (US)

(73) Assignee: THE BOEING COMPANY, Chicago, IL (US)

( * ) Notice: Subject to any disclaimer, the term of this patent is extended or adjusted under 35 U.S.C. 154(b) by 0 days. days.

(21) Appl. No.: 15/337,011

(22) Filed: Oct. 28, 2016

(51) Int. Cl.
| | |
|---|---|
| *G02B 6/02* | (2006.01) |
| *G01K 11/32* | (2006.01) |
| *G02B 6/44* | (2006.01) |
| *G02B 7/00* | (2006.01) |
| *B64D 47/00* | (2006.01) |

(52) U.S. Cl.
CPC ......... *G02B 6/02042* (2013.01); *B64D 47/00* (2013.01); *G01K 11/32* (2013.01); *G01K 11/3206* (2013.01); *G02B 6/443* (2013.01); *G02B 6/4495* (2013.01); *G02B 7/008* (2013.01)

(58) Field of Classification Search
None
See application file for complete search history.

(56) References Cited

U.S. PATENT DOCUMENTS

| | | | | | |
|---|---|---|---|---|---|
| 4,151,747 | A | * | 5/1979 | Gottlieb | G01K 11/32 356/32 |
| 5,144,690 | A | * | 9/1992 | Domash | G01D 5/35383 385/12 |
| 5,251,274 | A | * | 10/1993 | Carlstrom | G01K 5/52 250/227.16 |
| 5,841,131 | A | * | 11/1998 | Schroeder | G01D 3/036 250/227.14 |
| 5,987,200 | A | * | 11/1999 | Fleming | G02B 6/02204 385/12 |
| 6,462,329 | B1 | * | 10/2002 | Davis | G01K 1/20 250/227.14 |
| 6,563,970 | B1 | * | 5/2003 | Bohnert | G01L 9/0007 385/13 |
| 6,865,194 | B1 | * | 3/2005 | Wright | G01K 11/32 356/73.1 |

(Continued)

OTHER PUBLICATIONS http://fibercore.com/product/multicore-fiber dated Oct. 28, 2016.

*Primary Examiner* — Michelle R Connelly
(74) *Attorney, Agent, or Firm* — Marshall, Gerstein & Borun LLP

(57) ABSTRACT

An optical fiber cable assembly which includes an optical fiber cable which includes at least a first core and a second core positioned spaced apart from one another within a cladding material, wherein the at least first core and the second core and the cladding material extend in a direction of a length of the optical fiber cable. The assembly further includes material positioned at a predetermined location along the length of the optical fiber cable, wherein the material is associated with the optical fiber cable such that when the material is exposed to an environment change, the material transmits a force onto the optical fiber cable, changing a shape of the optical fiber cable.

9 Claims, 7 Drawing Sheets

(56) References Cited

U.S. PATENT DOCUMENTS

| | | | | |
|---|---|---|---|---|
| 8,303,176 | B2* | 11/2012 | Kochergin | G01K 11/32 374/131 |
| 2003/0209655 | A1* | 11/2003 | Wang | G01L 1/246 250/227.14 |
| 2004/0206892 | A1* | 10/2004 | Martinez | G01D 5/35383 250/227.14 |
| 2004/0218861 | A1* | 11/2004 | Vincelette | G02B 6/0218 385/37 |
| 2009/0074348 | A1* | 3/2009 | Xia | G01K 13/00 385/12 |
| 2009/0262779 | A1* | 10/2009 | Andrejco | G01K 11/3206 374/131 |
| 2017/0146371 | A1* | 5/2017 | Kozlov | G01D 5/268 |

* cited by examiner

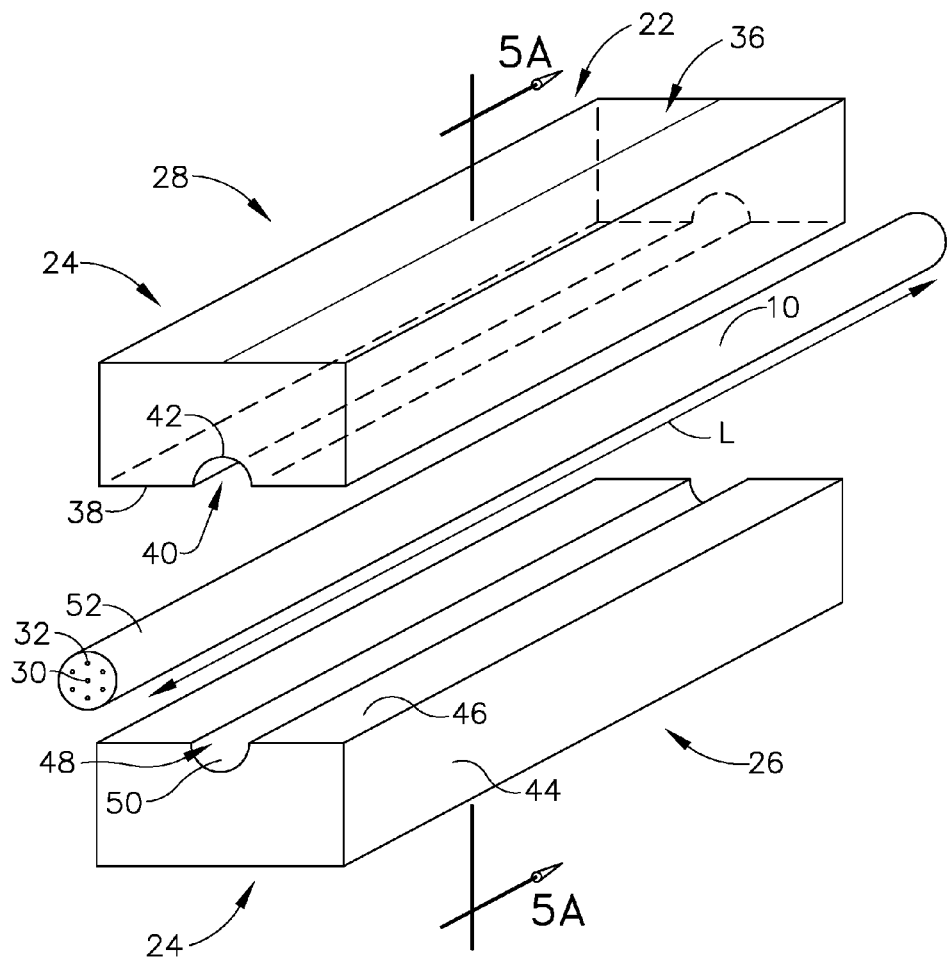
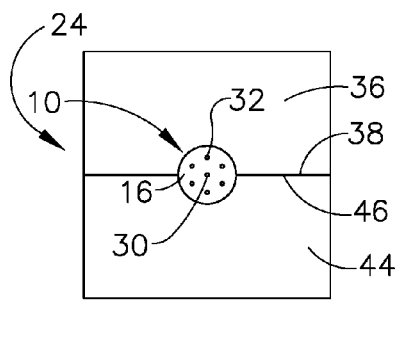 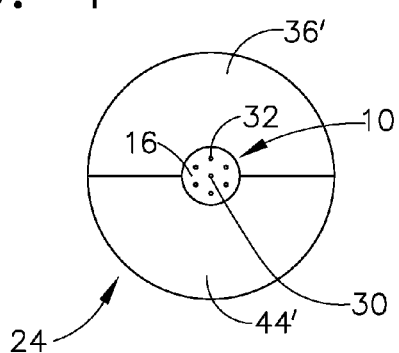
FIG. 5A          FIG. 5B

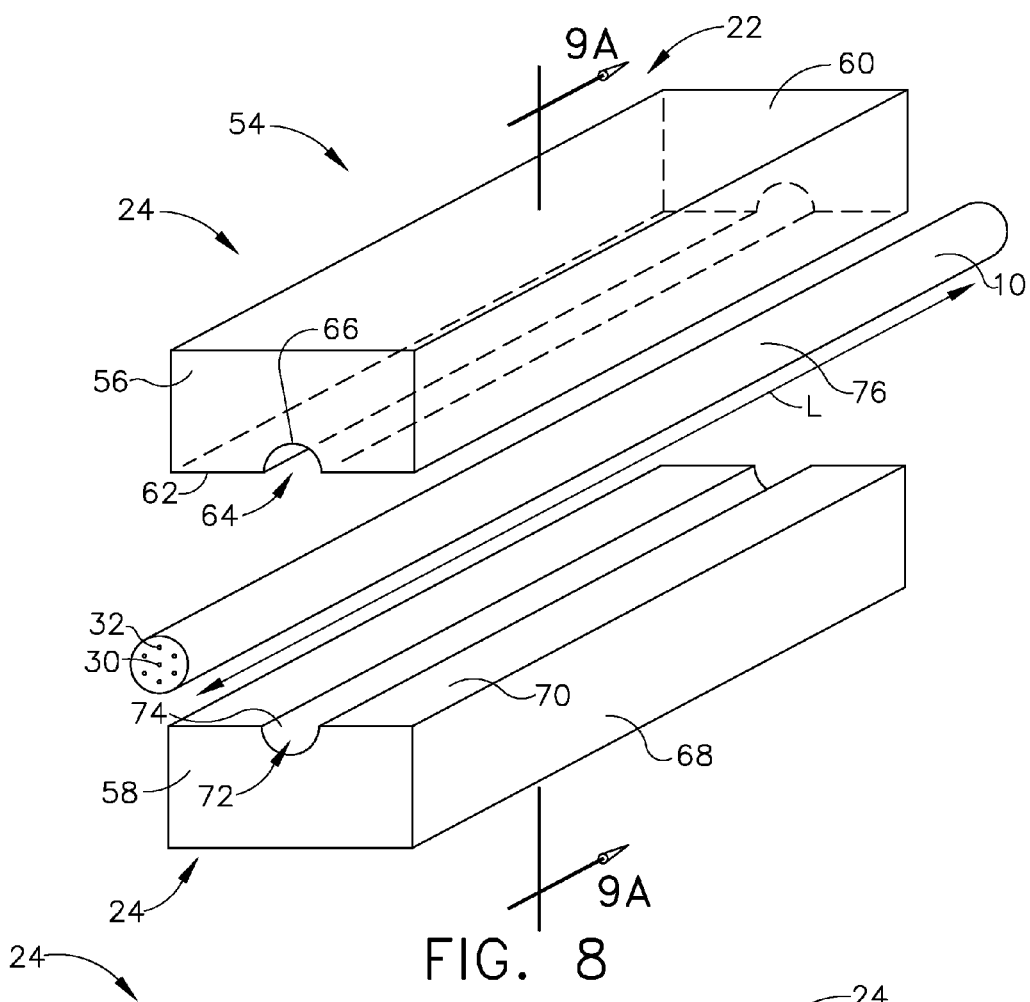
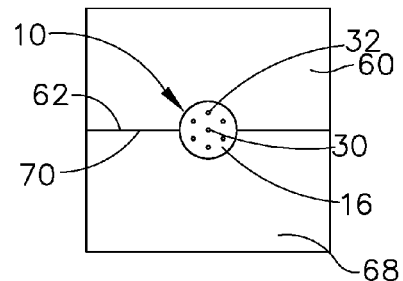 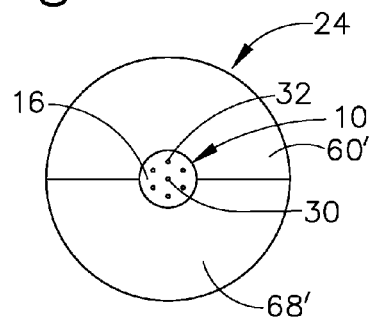
FIG. 9A  FIG. 9B

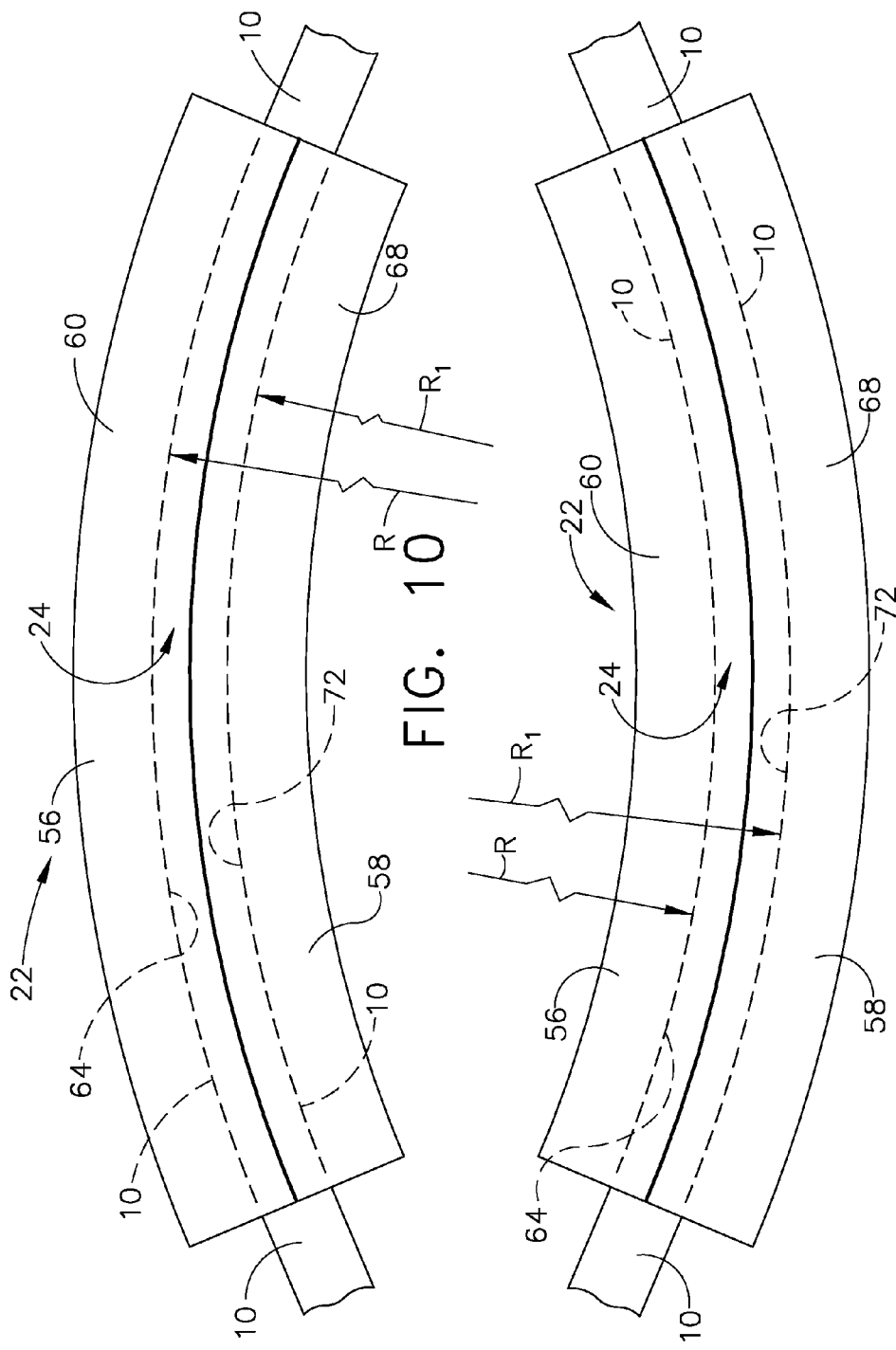

MULTICORE OPTICAL FIBER CABLE STRAIN ENHANCEMENT

FIELD

This invention relates to an optical fiber cable, and more particularly, to a multicore optical fiber cable.

BACKGROUND

An optical fiber cable is typically constructed of a glass or plastic core. The core is generally configured in a cylindrical shape and extends along the length of the cable. The core is encased within a cladding material constructed of a glass material which also extends along the length of the cable. The cladding material is constructed of a glass or plastic material which is different in composition from the material from which the core is constructed. The cladding material will typically have a lower refractive index than the refractive index of the material which is used to construct the core. In various constructions of optical fiber cable, the cladding material is surrounded by a buffer material such as a protective coating or a protective encasement constructed of high strength fibers. The optical fiber cable will often also include an outer protective jacket constructed of a strong durable material which surrounds the buffer material.

An optical fiber cable is used in different applications and within different environments. The core will carry a transmitted light beam which, in many examples, will carry data. The light beam signal transmits data within the core at a high rate of speed and the core provides a broader bandwidth than more traditional metallic cable.

In some constructions of an optical fiber cable, multiple cores are provided which are positioned within the cladding material of the cable. These multicore optical cables are similarly constructed as the single core optical fiber cable, however, the multiple cores in the multicore optical fiber cable are positioned within the cladding material spaced apart from one another at known distances. In a normal operating condition with the cable extending in a relatively straight orientation which may include relatively gentle curvatures, the cores are isolated from one another from cross communication between cores.

The transmission of a light beam in a first core of the multiple cores, generates an evanescent field that extends beyond the boundary surface of the first core. The evanescent field extends into the lower refractive indexed cladding material. With a second core present having a higher refractive index than that of the cladding material and with the second core positioned in close enough proximity to the first core, a phenomenon of evanescent coupling takes place between the first and second cores. As mentioned above, the separation between cores within a multiple core optical fiber cable will typically position, for example, a first and second core sufficiently far enough apart such that a signal transmitted within the first core will not affect the second core. However with a first and second core moved to a position such that they are in close enough proximity to one another, the evanescent field created by the transmission within the first core will affect and influence the second core. Bending of a core carrying a signal also causes the shape of the evanescent field to change shape. If the core is bent past a critical point the field may interact with an adjacent core. These affects are commonly known as an evanescent coupling phenomenon which results in a transfer of energy to the second core.

Should the second core not be transmitting a signal at the time the evanescent field becomes present, the evanescent coupling will propagate a signal in the second core. This propagated signal in the second core can be detected and measured. Should the second core already be transmitting a signal at the time of the evanescent coupling, the evanescent coupling will alter that signal within that second core. The altered signal in the second core can also be detected and measured.

When a light beam is transmitted in a first core of a multiple core optical fiber cable, where the cable is positioned to extend in a relatively straight orientation or with gentle curves, the light beam internally reflects at the boundary of the first core as the light beam is transmitted along the core without cross communication occurring between cores in the multicore optical fiber cable. However, should the multicore optical fiber cable be positioned with a sufficient bend in the cable, the angle of incident of the light beam on the boundary of the first core carrying a light beam transmission will change as a result of the bend in that core in which the light beam is transmitted. Should the angle of incident of the light beam transmission exceed a critical angle for the material from which the first core is constructed, at least a portion of the light beam will be refracted and be transmitted into the cladding material. This transmission of the light beam signal can interact with a nearby second core and result in the refracted light beam being transmitted along a second core. The transmission of this transmitted light beam within the second core can also be detected and measured.

With a light beam signal being transmitted in a first core, the transfer of energy to a second core can be facilitated through the operation of the evanescent coupling and/or by way of the light refraction phenomena. Thus, with moving a first and a second core within a distance of the field of influence of the evanescent field and changing the distance between the first and second core within the field of influence will result in changing the amount of energy being transferred to the second core. As the first and second core move closer together the transfer of energy will be greater to the second core and as the distance of separation increases the amount of energy transferred to the second core is diminished. In the instance of bending of the cable, this results in the bending of the boundary of the first core. Once the internally reflected light beam within the first core exceeds beyond the critical angle of the first core, the amount of energy refracted to and transmitted to the second core increases and correspondingly the amount of energy transmitted decreases as the bend returns the angle of incident of the light beam closer to the critical angle. Thus, with a change of the optical fiber cable configuration along with a transmission of a light beam along a first core, a detectable and measurable energy transfer into the second core as a result of one or both of the phenomena will take place.

With the cores within a multicore optical cable being constructed of a material such as glass, the glass is a substantially inert material, having low thermal expansion coefficients and is resistant to compressive strain. Thus, in order to carry out induced evanescent coupling and/or transmission of light beam energy from a first to a second core within a multicore optical fiber cable, localized alteration of the shape of the cable needs to take place which can effect distance between the first and second cores within the optical fiber cable and/or localized alteration of the shape of the cable with bending of the optical fiber cable which results in bending of the cores within the cable needs to be accomplished. This localized manipulation of the optical fiber cable needs to be usable and flight worthy reliable. Such manipulation can result in the use of multicore optical fiber cable, with appropriate calibration as needed, as a sensor, switch or modulator.

The features, functions, and advantages that have been discussed can be achieved independently in various embodiments or may be combined in yet other embodiments further details of which can be seen with reference to the following description and drawings.

SUMMARY

An embodiment provides an optical fiber cable assembly which includes an optical fiber cable which includes at least a first core and a second core positioned spaced apart from one another within a cladding material, wherein the at least first core and the second core and the cladding material extend in a direction of a length of the optical fiber cable. The assembly further includes material positioned at a predetermined location along the length of the optical fiber cable wherein the material is associated with the optical fiber cable such that when the material is exposed to an environment change the material transmits a force onto the optical fiber cable changing a shape of the optical fiber cable.

An embodiment provides an aircraft assembly which includes an aircraft and an optical fiber cable positioned within the aircraft, wherein the optical fiber cable includes at least a first core and a second core positioned spaced apart from one another within a cladding material and the at least first core and second core and the cladding material extend in a direction of a length of the optical fiber cable. The assembly further includes a material secured to and positioned at a predetermined location along the length of the optical fiber cable wherein the material comprises at least one composition which when exposed to an environment change the material transmits a force to the optical fiber cable changing a shape of the optical fiber cable; or a polymer which exhibits photoisomerization secured to and positioned at a predetermined location along the length of the optical fiber cable further including a third core positioned within the cladding in photo communication with the polymer, wherein light transmitted through the third core results in the polymer expanding and transmitting a force to the optical fiber cable changing a shape of the optical fiber cable.

BRIEF SUMMARY OF THE DRAWINGS

FIG. 4 is a schematic exploded view of a first embodiment of the optical fiber cable assembly of FIG. 3;

FIG. 5A is a cross section view along line 5-5 of FIG. 4 of the first embodiment of the optical fiber cable assembly of FIG. 4 assembled;

FIG. 5B is a cross section view of another example of the first embodiment of the optical fiber cable assembly of FIG. 5A;

FIG. 8 is a schematic exploded view of a second embodiment of the optical fiber cable assembly of FIG. 3;

FIG. 9A is a cross section view along line 9-9 of FIG. 8 of the second embodiment of the optical fiber cable assembly of FIG. 8 assembled;

FIG. 9B is a cross section view of another example of the second embodiment of the optical fiber cable assembly of FIG. 9A;

FIG. 10 is a side elevation view of the second embodiment of the optical fiber cable assembly of FIG. 8 wherein an increase in temperature has been exposed to the optical fiber cable assembly changing the shape of the optical fiber cable with bending the optical fiber cable;

FIG. 11 is a side elevation view of the second embodiment of the optical fiber cable assembly of FIG. 8 wherein a decrease in temperature has been exposed to the optical fiber cable assembly changing the shape of the optical fiber cable with bending the optical fiber cable;

DESCRIPTION

Figure 1:
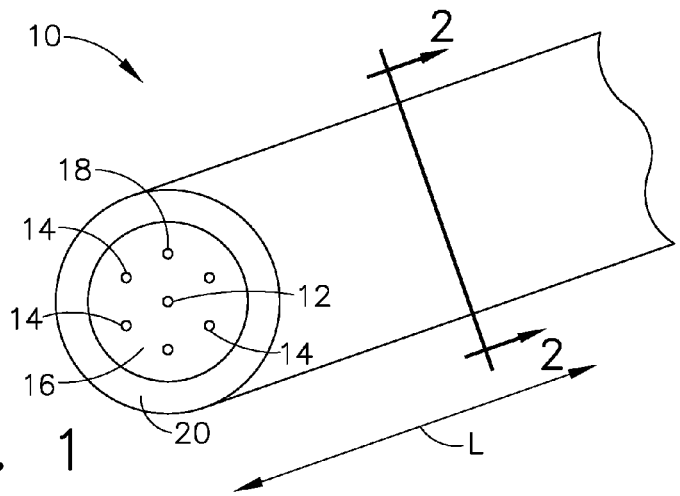
FIG. 1 is schematic perspective view of a multicore optical fiber cable.

Multicore optical fiber cable provides high rate of transmission and high bandwidth for each core. The cores are sufficiently spaced apart so as not to cause cross communications between cores with the cable extending in a relatively straight configuration inclusive of gentle curves.

One way cross communication can occur between cores is by way of bending of the cable which results in bending of the cores. Sufficient bending of the cores can cause a light beam traveling within a first core to increase its angle of incident with the boundary of the first core beyond the critical angle for that material. This bending of the boundary of the first core will result in the light beam to refract out of the first core. The refracted light beam is transmitted to a second core within the cable. This refracted light beam will transmit along the second core. This phenomenon can be detected in the second core and be measured.

Another way cross communication can take place is by way of a phenomenon known as evanescent coupling between a first core and a second core. A light signal transmitting within a first core generates an evanescent field as earlier discussed. The field extends beyond the boundary of the first core and into the surrounding cladding material. With altering the distance between a first core and a second core, the second core moves closer to the first core and within the influence of the evanescent field. With altering the bend radius of the core, the shape of the evanescent field changes as well. As a result, an evanescent coupling of the first and second cores takes place. The evanescent coupling, with the second core not already carrying a signal, will result in the propagation of a new signal within the second core. Should the second core already be transmitting a signal at the time of the coupling, the signal being transmitted within the second core will be altered by the evanescent coupling. The closer the positioning of the first and second cores will provide a stronger influence by the evanescent field on the second core and as the first and second cores are separated apart the influence diminishes. As earlier discussed, this phenomenon of evanescent coupling can be detected from the second core and can also be measured.

Thus, with a first core within a multicore optical fiber cable transmitting a light beam, the changing of the shape or configuration of the multicore optical fiber cable such as by bending the cores affecting transmission of energy from the first core to a second core and/or moving the first and second cores within a field of evanescent coupling, a detectable and measurable energy influence within the second core takes place. This detectable and measurable occurrence facilitates, with appropriate calibration as needed, the multicore optical fiber cable to operate as a useful sensor, switch or modulator.

As a result, there is a need to be able to provide usable and reliable capability of changing the configuration or shape of multicore optical fiber cable at predetermined locations along the cable that can affect the bending of the cores and/or proximity of the cores within the cable. In referring to FIGS. 1 and 2, a multicore optical cable 10 is shown. In this example, multicore optical cable 10 includes a centrally positioned center core 12 and six concentrically distributed cores 14 positioned around center core 12. Any number of cores can be employed for multicore optical cable 10 so long as there are a minimum of at least two cores are present and are used in interacting with one another with respect to transfer of energy from one core to another core as will be appreciated in the discussions of various embodiments herein. As mentioned earlier, cores 12, 14 are constructed from one of a variety of materials such as glass or plastic. The diameter of the cores can vary and in this example the diameter of each of cores 12, 14 are eight microns (8 μm). Cores 12, 14 are cylindrical in shape and extend along length L of cable 10 spaced apart from one another within cladding material 16. As mentioned earlier, the spacing between cores 12, 14 are at a sufficient distance from one another so as to avoid cross communication between cores 12, 14.

Cladding material 16 is, in this example, constructed of a glass material. Cladding material 16 is constructed of a material having a lower refractive index than the refractive index of material of cores 12, 14. Cladding material 16 also extends along length L of cable 10. In an example of a traditional operation of multicore fiber cable 10, a light beam carrying data is transmitted in a first core such as 12, cable 10 is positioned to extend so as to maintain light beams carrying data reflecting internally with boundary 18. This would have the orientation of cable 10 extending such that the angle of incidence of the transmitting light beam is kept at less than a critical angle for the material the core is constructed. This will reduce or eliminate the light beam from refracting into cladding material 16.

Additional protective layers are applied to the exterior of cladding material 16 to provide protection to the cores 12, 14 from undesirable conditions such as moisture and impact forces exerted onto cable 10. Buffer material 20 is constructed from one of a variety of constructions such as a polymer such as polyimide, dual acrylate, etc. Additional coverings and jackets can also be further applied to buffer material 20 to provide to provide further protection to cores 12, 14.

Figure 3:
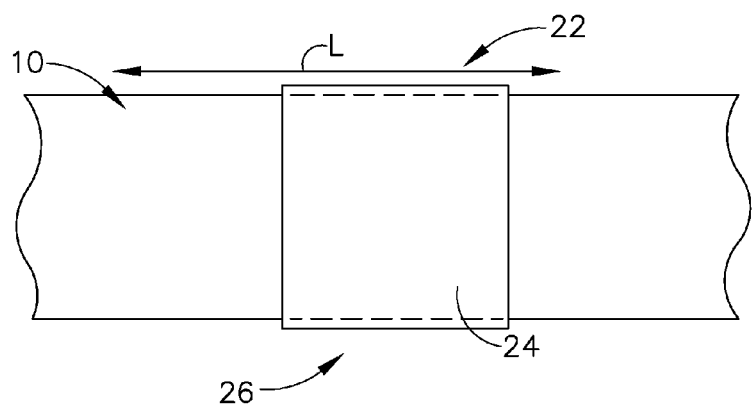
FIG. 3 is a schematic side elevation view of an optical fiber cable assembly which includes the multicore optical fiber cable of FIG. 1.

In referring to FIG. 3, a schematic representation of a multicore optical fiber cable assembly 22 of the present disclosure is shown. Various embodiments of optical fiber cable assembly 22 will be discussed herein which include use of material 24 positioned at a predetermined location 26 along length L of optical fiber cable 10, wherein material 24 is associated with optical fiber cable 10 such that when material 24 is exposed to an environment change, material 24 transmits a force onto optical fiber cable 10, changing a shape of optical fiber cable 10. As will be discussed herein, various examples of composition(s) of material 24 and their structure(s) will be shown, as well as, various kinds of environment change to which material 24 will be exposed will also be discussed. In addition, various changes as to shape of optical fiber cable 10 will be discussed that will facilitate the communication or transfer of energy from a first core to a second core of optical fiber cable 10.

A first embodiment 28 of optical fiber cable assembly 22 is shown in FIGS. 4-7. Optical fiber cable 10, in this example, has first core 30 and second core 32 positioned spaced apart from one another within cladding material 16. First and second cores 30, 32 and cladding material 16 extend along a direction of length L of optical fiber cable 10. In this example of first embodiment 28, material 24 is positioned at a predetermined location 26 along optical fiber cable 10 and is structured to have a first portion 36 with first side 38 which defines first groove 40 with first groove 40 having first surface 42. Material 24 is further structured to have second portion 44 with first side 46 which defines a second groove 48 with second groove 48 having second surface 50. As seen in FIG. 5A, for example, optical fiber cable 10 is positioned within the first and second grooves 40, 48 with first side 38 of the first portion 36 and first side 46 of second portion 44 positioned in a facing relationship to one another.

In first embodiment 28, material 24 is secured to fiber optical cable 10. First side 38 of first portion 36 and first side 46 of second portion 44 are bonded together with an adhesive such as an epoxy or other thermoset material. First and second portions 36, 44 are bonded together with optical fiber cable 10 positioned within first groove 40 and bonded to first surface 42 of first groove 40 and optical fiber cable 10 positioned within second groove 48 bonded to second surface 50 of second groove 48. Bonding of optical fiber cable 10 within first and second grooves 40, 48 utilizes an adhesive such as an epoxy or other thermoset material. An outer surface 52 of optical fiber cable 10 is bonded to first surface 42 of first groove 40 and bonded to second surface 50 of second groove 48. In one example outer surface 52 includes outer surface of cladding material 16 of optical fiber cable 10. In another example, outer surface 52 includes outer surface of buffer material 20 (not shown in FIGS. 4-5B) surrounding cladding material 16 of optical fiber cable 10.

One example of a structure of material 24 of first embodiment 28 is shown in FIG. 5A. The external shape of material 24, in this example, is configured in more of a square or rectangular configuration. In contrast, in a second example of a structure of material 24 is shown in FIG. 5B. The external shape of first portion 36' and second portion 44' are configured to have a more rounded external shape and a cylindrical configuration along the length L of cable 10.

Variations of external shapes of material 24 may be employed depending on the space available in which assembly 22 will need to operate.

Figure 6:
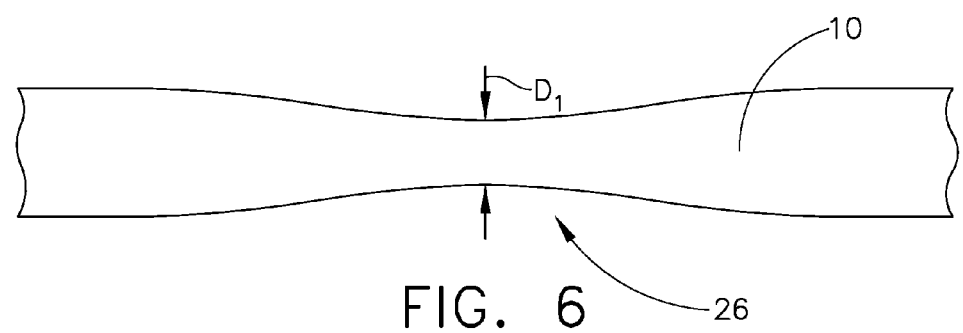
FIG. 6 is a schematic view of the optical fiber cable of the first embodiment wherein an increase in temperature was exposed to the first embodiment of the optical fiber cable assembly of FIG. 4 changing the shape of the optical fiber cable with stretching the optical fiber cable.
Figure 7:
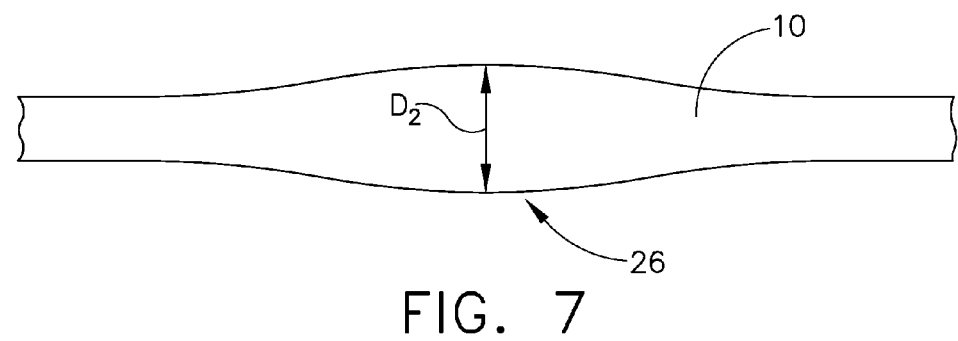
FIG. 7 is a schematic view of the optical fiber cable of the first embodiment wherein a decrease in temperature was exposed to the first embodiment of the optical fiber cable assembly of FIG. 4 changing the shape of the optical fiber cable with contracting the optical fiber cable.

In first embodiment 28, material 24 employed is constructed of the same composition which, in this example, includes polytetrafluoroethylene. Polytetrafluoroethylene is useful for operating in various temperature ranges inclusive of cryogenic temperature ranges and in this example is useful in facilitating optical fiber cable assembly 22 to operate as a sensor where the environment change includes a temperature change. For example, as an environment temperature increases material 24, polytetrafluoroethylene, (not shown in FIG. 6), will expand and with material 24 bonded to optical fiber cable 10, material 24 exerts a force onto optical fiber cable 10. In this instance, the force results in stretching of optical fiber cable 10 at the predetermined location 26, as seen in FIG. 6. Stretching of cable 10 results in a reduction in diameter of optical fiber cable 10 as seen as D1 in predetermined location 26 of optical fiber cable 10. In contrast, as seen in FIG. 7, with a decrease in temperature, material 24, polytetrafluoroethylene, (not shown in FIG. 7), contracts which results in a contracting force being exerted onto optical fiber cable 10 at predetermined location 26 resulting in an increase in diameter D2 of optical fiber cable 10 at predetermined location 26.

In this first embodiment 28, the decreasing of the diameter of optical fiber cable 10, as seen in FIG. 6, will result in first core 30 and second core 32 moving closer together with respect to one another. With first and second cores 30, 32 moving closer together an evanescent coupling phenomenon is provided an opportunity to take place between first and second cores 30, 32. For example, with first core 30 carrying a light beam transmission and second core 32 not carrying a light beam, as the temperature increases material 24 stretches and first and second cores 30, 32 move closer together and second core 32 moves into a field of influence of the evanescent field generated by the transmission within first core 30. The closer second core 32 comes with respect to first core 30, a stronger evanescent coupling occurs between first and second cores 30, 32 resulting in a stronger propagation of a transmission within second core 32. With a reduction in temperature, material 24 contracts thereby contracting cable 10 with diameter D2 increasing. First and second cores 30, 32 move apart from one another. With diameter D2 increasing, the evanescent coupling weakens and so does the propagation of a transmission in second core 32.

As the temperature changes in the environment, the corresponding stretching and contracting of optical fiber cable 10 will take place. The evanescent coupling will provide a detectable and measurable propagation of a transmission in second core 32 or in an alternative where second core 32 is already carrying a transmission, the coupling will cause an alteration of an existing transmission within second core 32. Associated calibration of the evanescent coupling phenomenon, in either instance where second core 32 is not already transmitting a signal or is already transmitting a signal, provides assembly 22 to operate as a temperature sensor.

In referring to FIGS. 8-12 a second embodiment 54 of optical fiber cable assembly 22 is shown. Optical fiber cable 10, in this example, similarly as described above for first embodiment 28, has first core 30 and second core 32 positioned spaced apart from one another within cladding material 16. First and second cores 30, 32 and cladding material 16 extend along a direction of length L of optical fiber cable 10.

In this example of second embodiment 54, material 24 is positioned at a predetermined location 26 along optical fiber cable 10 and material 24 is constructed of two compositions wherein a first composition 56 is structured to have a first coefficient of thermal expansion and a second composition 58 having a second coefficient of thermal expansion. The first composition 56 and the second composition 58 are bonded together, which will be discussed below, similar to the structure described for the first embodiment 28. An adhesive such as an epoxy or other thermoset material is used in bonding the first composition 56 and second composition 58 to optical fiber cable 10 as well as to each other.

First composition 56 is constructed of first portion 60, as seen in FIG. 8. First portion 60 has a first side 62 which defines first groove 64 wherein first groove 64 has a first surface 66. Second composition 58 is constructed into a second portion 68 with a first side 70 which defines a second groove 72 wherein the second groove 72 has a second surface 74. Optical fiber cable 10 is positioned within the first and second grooves 64, 72 with first side 62 of first portion 60 and with first side 70 of second portion 68 positioned in a facing relationship to one another. First side 62 of first portion 60 and first side 70 of second portion 68 are bonded together with an adhesive such as an epoxy or other thermoset material and optical fiber cable 10 is bonded to first surface 66 of first groove 64 and to second surface 74 of second groove 72 with adhesive such as an epoxy or other thermoset material. This securement of material 24 to cable 10 provides material 24 the ability to exert a force onto cable 10. Outer surface 76 of cable 10 is bonded to first surface 66 of first groove 64 and bonded to second surface 74 of second groove 72 which in one example includes outer surface 76 to include cladding material 16 of optical fiber cable 10 or in another example to include buffer material 20 surrounding cladding material 16 of optical fiber cable 10.

One example of the structure of material 24 of second embodiment 54 is shown in FIG. 9A, wherein the external shape is configured in more of a square or rectangular configuration. In contrast, in a second example of a structure of material 24 in this second embodiment 54 is shown in FIG. 9B. The external shape of first portion 60' and second portion 68', as shown in FIG. 9B, are configured to have a more rounded external shape and a cylindrical configuration along the length L of cable 10. Variations of external shapes of material 24 may be employed depending on the space available in which assembly 22 will need to operate.

In this example of the second embodiment 54, the first coefficient of thermal expansion of first composition 56 is greater than the second coefficient of thermal expansion coefficient of second composition 58. Thus, first composition 56 will experience a greater expansion than second composition 58 as temperature increases and first composition 56 will experience a greater contraction than second composition 58 as the temperature decreases. The first and second compositions 56, 58 can be of a wide variety of compositions such as metal, composite, polymers, etc. so long as the compositions for the first portion 60 and the second portion 68 for second embodiment 54 have different coefficients of thermal expansion. With first and second portions 60, 68 bonded to cable 10, each will expand or contract at different rates as the temperature changes. This will cause cable 10 to change shape with experience predominantly bending with experiencing some either stretching or contracting of cable 10 diameter.

In referring to FIGS. 10 and 11, an environment change of temperature is exposed to material 24 of second embodiment 54 of optical fiber cable assembly 22, wherein material 24 includes first portion 60 constructed of a first composition 56 and a second portion 68 constructed of a second composition 58. In referring to FIG. 10, assembly 22 is exposed to a temperature increase. As mentioned above, first portion 60 is constructed of first composition 56 having a higher thermal coefficient of expansion than second composition 58 from which second portion 68 is constructed. As a result, first composition 56 of first portion 60 expands more than second composition 58 of second portion 68. Some stretching takes place with respect to cable 10 however, bending of cable 10 is of a greater consequence such that first portion 60, second portion 68 and optical fiber cable 10 all bend. Bending of cable 10 is seen with a radius of curvature R of the optical fiber cable positioned within the first groove 64 of first portion 60 and is greater than a radius of curvature R1 of the optical fiber cable positioned within second groove 72.

In referring to FIG. 11, assembly 22 is exposed to a temperature decrease. First portion 60 is constructed of first composition 56 having a higher coefficient of thermal expansion than second composition 58 from which second portion 68 is constructed. As a result, first composition 56 of first portion 60 results in a greater contraction than second composition 58 of second portion 68. Some contraction of cable 10 takes place, however, bending of cable 10 is of greater consequence such that first portion 60, second portion 68 and optical fiber cable 10 all bend. Bending of cable 10 is seen with a radius of curvature R1 of optical fiber cable 10 positioned within second groove 72 of second portion 68 and is greater than a radius of curvature R of the optical fiber cable 10 positioned within first groove 64 of first portion 60.

The effect to cable 10 utilizing the second embodiment 54 of the optical fiber cable assembly 22 provides some stretching and contracting of cable 10 in response to the temperature change, however, the substantial change in shape of cable 10 is a result of cable 10 bending. As discussed earlier, as cores such as first core 30 bends beyond a critical angle, of the material which first core 30 is constructed, the light beam transmitted within first core 30 begins to refract out of and beyond boundary 18 of the core. The transmission of light from first core 30 increases as the angle of incident of the transmitted light beam goes further beyond the critical angle for that material. Thus, increased bending will result in more light being transmitted beyond boundary 18 of first core 30 and is available to be received by second core 32 and transmitted along second core 32. Thus, increased bending will result in a stronger transmission in second core 32 and increased evanescent coupling. Less bending will result in less light transmission into and along the second core 32 and decreased evanescent coupling. However, the calibration of the effect of transmission of a signal within the second core 32 will provide second embodiment 54 of optical fiber cable assembly 22 to operate as a temperature sensor.

Figure 12:
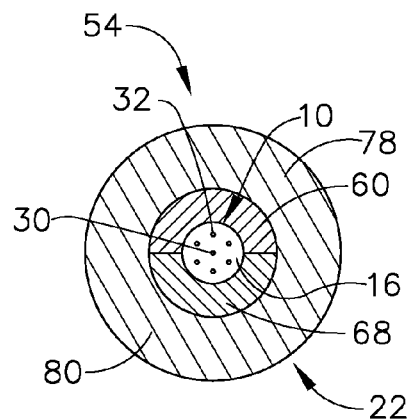
FIG. 12 is another example of a schematic cross section view of the second embodiment of the optical fiber cable assembly as shown in FIG. 9B.

In referring to FIG. 12, second embodiment 54 of optical fiber cable assembly 22 further includes an enclosure 78, such as constructed in a configuration as a ring or cylinder. Enclosure 78 is positioned about and restricts movement of the first and second portions 60, 68 in a radial direction with respect to optical fiber cable 10. Enclosure 78 is constructed of a third composition 80 having a lower coefficient of thermal expansion than the first coefficient of thermal expansion of first composition 56 and second coefficient of thermal expansion of second composition 58. Enclosure 78 provides confinement of first and second portions 60, 68 thereby providing a more accentuated effect the expansion and contraction of first portion 60 and second portion 68 will have on cable 10. As a result, the application of enclosure 78 will provide increased sensitivity in optical fiber cable assembly 22 operating as a temperature sensor.

Figure 13:
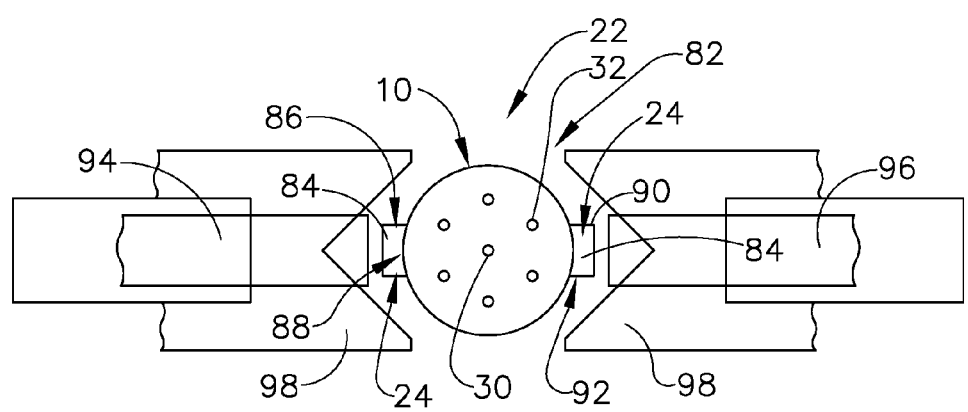
FIG. 13 is a schematic cross section of a third embodiment of the optical fiber cable assembly of FIG. 3 with a ferromagnetic composition associated with the optical fiber cable in the presence of solenoids.

In referring to FIG. 13, a third embodiment 82 of optical fiber cable assembly 22 is shown. Material 24 in this embodiment includes a ferromagnetic composition 84 and the environment change includes a change in an induced magnetic field. A first portion 86 of ferromagnetic composition 84 is secured to one side 88 of optical fiber cable 10 and second portion 90 of ferromagnetic composition 84 is secured to an opposing side 92 of optical fiber cable 10. Ferromagnetic composition 84 is secured to cable 10 with an adhesive such as an epoxy or other thermoset material, or directly deposited to cable 10.

A first solenoid 94 is positioned adjacent to and spaced apart from first portion 86 and second solenoid 96 is positioned adjacent to and space apart from second portion 90. Brackets 98 are provided to maintain cable 10 confined within alignment with first and second solenoids 94, 96. Activating for example only first solenoid 94 will attract first portion 86 toward first solenoid 94 bending cable 10. Similarly only activating second solenoid 96 will attract second portion 90 toward second solenoid 96 bending cable 10. This third embodiment 82 can be used to transmit light from first core 30 for example into a second core 32 wherein light beam transmitted along first core 30 can refract out of first core 30 with bending causing the angle of incident of the light beam exceeding the critical angle for the material of first core 30, and causing an increase in evanescent coupling. The light that transmits out of first core 30 is received by second core 32 and transmits along second core 32 wherein that transmission along second core 32 can perform as a switch or with a signal already transmitting within second core 32 operate as a modulator.

Figure 14:
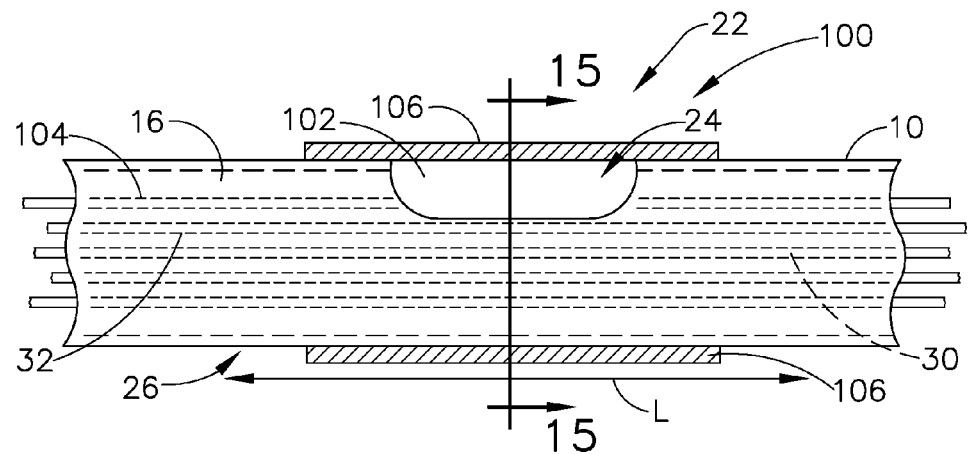
FIG. 14 is a schematic side elevation cross section view of a fourth embodiment of the optical fiber cable assembly.
Figure 15:
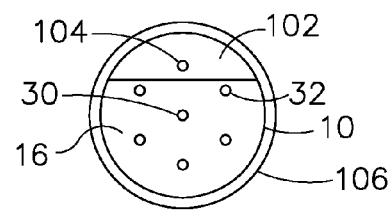
FIG. 15 is a schematic cross section view as seen along line 15-15 of FIG. 14.

In referring to FIGS. 14 and 15, a fourth embodiment 100 of the optical fiber cable assembly 22 is shown. A first core 30 and a second core 32 are shown. Material 24 includes polymer 102 which exhibits photoisomerization. With polymer 102 exposed to a light beam, polymer 102 expands and with removal of the light beam the polymer 102 material returns to its original position. Polymer 102 is directly adhered to cable 10 or secured to cable 10 with an adhesive such as an epoxy or other thermoset material and is positioned at a predetermined location 26 along length L of optical fiber cable 10. Polymer 102 is in optical connection with third core 104 of optical fiber cable 10. With this arrangement, a light beam transmitted along third core 104 is received by polymer 102 and polymer 102 transmits a force onto optical fiber cable 10 changing the shape of optical fiber cable 10 with bending cable 10. As a result, for example, with first core 30 carrying a light beam, the bending of cable 10 causes first core 30 to bend changing the angle of incident of the transmitted light beam and causing an increase in evanescent coupling. With the light beam exceeding the critical angle for first core 30 light will refract out of first core 30 and into second core 32. This provides fourth embodiment 100 to operate, with calibration as needed, as a switch or even a modulator.

Polymer 102 can include an azobeneze, derivative of azobeneze or other polymer which exhibits photoisomerization. In this example, a portion of cladding material 16 is removed from cable 10 placing third core 104 in photo communication with polymer 102. In another example of fourth embodiment 100, enclosure 106 is positioned about polymer 102. Radially confining at least a portion of the polymer 102 against optical fiber cable 10. Enclosure 106 shields polymer 102 from ambient light and also enhances the sensitivity of assembly 22 with confining the expansion of polymer 102 and directing the exertion of that force onto cable 10.

Figure 2:
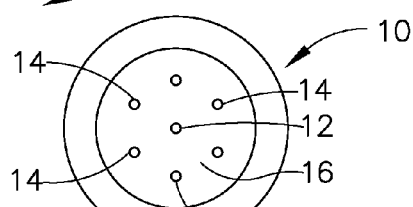
FIG. 2 is a cross section view of the multicore optical fiber cable as seen across line 2-2 in FIG. 1.
Figure 16:
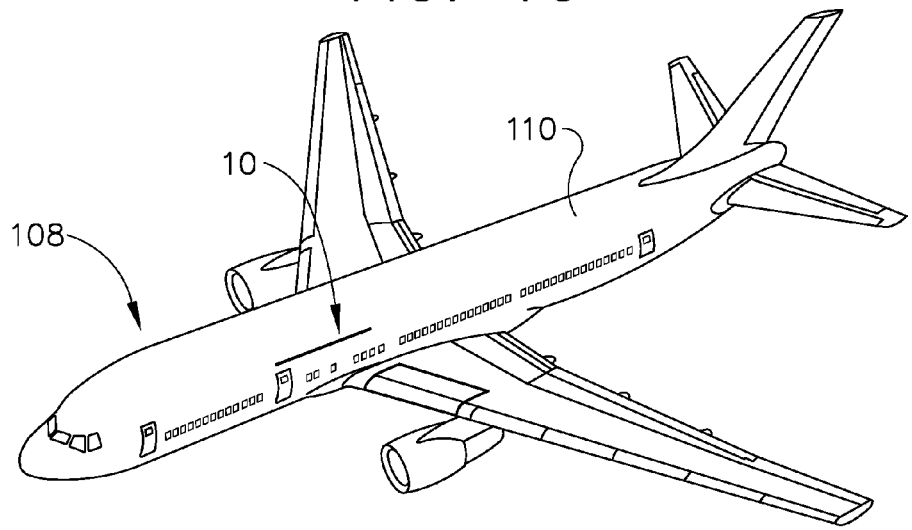
FIG. 16 is a perspective view of an aircraft assembly.

In referring to FIG. 16, aircraft assembly 108 is shown which includes aircraft 110. Assembly 108 includes optical fiber cable 10 positioned within aircraft 110. Optical fiber cable 10 includes at least a first core 30 and a second core 32 positioned spaced apart from one another within a cladding material 16, as seen in FIGS. 1 and 2. The first and second cores 30, 32 extend in a direction L of the length of optical fiber cable 10. Material 24, as seen in FIG. 3, is secured to and positioned at a predetermined location 26 along length L of the optical fiber cable 10. Material 24 includes at least one composition which when exposed to an environment change the material transmits a force to optical fiber cable 10 changing a shape of optical fiber cable 10, as seen in FIGS. 4-13. Material 24 includes one of polytetrafluoroethylene; a first composition having a first coefficient of thermal expansion and a second composition having a second coefficient of thermal expansion; or a ferromagnetic composition.

Alternatively, material 24 includes polymer 102 which exhibits photoisomerization secured to and positioned at a predetermined location 26 along length L of optical fiber cable 10, as seen in FIGS. 14 and 15, which further includes third core 104 positioned within cladding material 16 in photo communication with polymer 102. Light transmitted through third core 104 results in polymer 102 expanding and transmitting a force to optical fiber cable 10 changing a shape of optical fiber cable 10. Polymer 102 includes an azobeneze or a derivative of azobeneze.

As described above, these materials can be employed to facilitate exertion of a force onto cable 10 resulting in changing the shape of cable 10. With changing the shape of cable 10, as described earlier, an imparting one or both phenomena of, evanescent coupling of first and second cores 30, 32 and/or light beam transmission from first core 30 into second core 32 can take place providing optical fiber cable assembly 22 to operate as a sensor, switch or modulator.

While various embodiments have been described above, this disclosure is not intended to be limited thereto. Variations can be made to the disclosed embodiments that are still within the scope of the appended claims.

What is claimed is:

1. An optical fiber cable assembly, comprising:
    an optical fiber cable comprising at least a first core and a second core positioned spaced apart from one another within a cladding material, wherein the at least first core and the second core and the cladding material extend in a direction of a length of the optical fiber cable; and
    material positioned at a predetermined location along the length of the optical fiber cable, wherein the material is associated with the optical fiber cable such that when the material is exposed to an environment change, the material transmits a force onto the optical fiber cable, changing a shape of the optical fiber cable, wherein:
        the material comprises a first portion with a first side which defines a first groove having a first surface;
        the material comprises a second portion with a first side which defines a second groove having a second surface;
        the optical fiber cable is positioned within the first and second grooves with the first side of the first portion and the first side of the second portion positioned in a facing relationship to one another; and
        the first side of the first portion and the first side of the second portion are bonded together with the optical fiber cable positioned within the first groove bonded to the first surface of the first groove with an adhesive and the optical fiber cable positioned within the second groove bonded to a second surface of the second groove with an adhesive.

2. The optical fiber cable assembly of claim 1, wherein the material is secured to the fiber optical cable.

3. The optical fiber cable assembly of claim 1, wherein an outer surface of the optical fiber cable bonded to the first surface of the first groove and bonded to the second surface of the second groove comprises the cladding material of the optical fiber cable or a buffer material surrounding the cladding material of the optical fiber cable.

4. The optical fiber cable assembly of claim 1, wherein the material comprises polytetrafluoroethylene and the environment change includes a temperature change such that with an increase in temperature the polytetrafluoroethylene expands which results in stretching of the optical fiber cable at the predetermined location and a reduction in a diameter of the optical fiber cable and with a decrease in temperature the polytetrafluoroethylene contracts which results in contracting of the optical fiber cable at the predetermined location and an increase in the diameter of the optical fiber cable.

5. An optical fiber cable assembly comprising:
    an optical fiber cable comprising at least a first core and a second core positioned spaced apart from one another within a cladding material, wherein the at least first core and the second core and the cladding material extend in a direction of a length of the optical fiber cable; and
    material positioned at a predetermined location along the length of the optical fiber cable, wherein the material is associated with the optical fiber cable such that when the material is exposed to an environment change, the material transmits a force onto the optical fiber cable, changing a shape of the optical fiber cable, wherein:
        the material comprises two compositions wherein:
            a first composition having a first coefficient of thermal expansion;
            a second composition having a second coefficient of thermal expansion; and
            the first and second compositions are secured to the optical fiber cable.

6. The optical fiber cable assembly of claim 5, wherein:
    the first composition is constructed into a first portion with a first side which defines a first groove having a first surface;
    the second composition is constructed into a second portion with a first side which defines a second groove having a second surface;
    the optical fiber cable is positioned within the first and second grooves with the first side of the first portion and with the first side of the second portion positioned in a facing relationship to one another; and
    the first side of the first portion and the first side of the second portion are bonded together and the optical fiber cable is bonded to the first surface of the first groove and the optical fiber cable is bonded to the second surface of the second groove.

7. The optical fiber cable assembly of claim 6, wherein an outer surface, of the optical fiber cable bonded to the first surface of the first groove and bonded to the second surface of the second groove, comprises the cladding material of the optical fiber cable or a buffer material surrounding the cladding material of the optical fiber cable.

8. The optical fiber cable assembly of claim 6, wherein;

the first coefficient of thermal expansion of the first composition is greater than the second coefficient of thermal expansion coefficient of the second composition;

the environment change includes:

a temperature increase which results in a greater expansion of the first composition of the first portion than an expansion of the second composition of the second portion resulting in bending of the first portion, the second portion and the optical fiber cable, wherein a radius of curvature of the optical fiber cable positioned within the first groove of the first portion is greater than a radius of curvature of the optical fiber cable positioned within the second groove; or a temperature decrease which results in a greater contraction of the first composition of the first portion than a contraction of the second composition of the second portion resulting in the bending of the first portion, the second portion and the optical fiber cable, wherein a radius of curvature of the optical fiber cable positioned within the first groove of the first portion is smaller than a radius of curvature of the optical fiber cable positioned within the second groove.

9. The optical fiber cable assembly of claim 8, further including an enclosure positioned about and restricting movement of the first and second portions in a radial direction with respect to the optical fiber cable, wherein the enclosure is constructed of a third composition with a lower coefficient of thermal expansion than the first coefficient of thermal expansion of the first composition and the second coefficient of thermal expansion of the second composition.

\* \* \* \* \*